United States Patent [19]

Witte et al.

[11] 4,410,834
[45] Oct. 18, 1983

[54] CIRCULAR FLUORESCENT LAMP WITH IMPROVED HOUSING CONTAINING BALLAST AND STARTING DEVICE

[75] Inventors: Dieter Witte, Düsseldorf; Alfons Jendrewski; Gerhard Nadler, both of Munich, all of Fed. Rep. of Germany

[73] Assignee: Patent-Treuhand-Gesellschaft für elektrische Glühlampen mbH, Munich, Fed. Rep. of Germany

[21] Appl. No.: 247,781

[22] Filed: Mar. 26, 1981

[30] Foreign Application Priority Data

Apr. 16, 1980 [DE] Fed. Rep. of Germany ....... 3014640

[51] Int. Cl.³ .............................................. H01J 7/44
[52] U.S. Cl. ........................................ 315/58; 315/62; 315/71; 362/216; 362/260
[58] Field of Search ................... 315/57, 58, 62, 70, 315/71; 362/216, 260, 257, 362

[56] References Cited

U.S. PATENT DOCUMENTS

| | | | |
|---|---|---|---|
| 2,492,764 | 12/1949 | Pistey | 362/216 |
| 2,623,346 | 1/1953 | Stoller | 362/216 |
| 2,652,483 | 9/1953 | Laidig et al. | 362/216 |
| 2,697,777 | 12/1954 | Rosa . | |
| 2,769,083 | 10/1956 | Archer | 362/216 |
| 2,817,004 | 12/1957 | Baumgartner et al. | 362/216 |
| 3,059,137 | 10/1962 | Reaves | 362/260 |
| 4,109,303 | 8/1978 | Hetherington | 362/216 |
| 4,225,905 | 9/1980 | Moriyama et al. . | |
| 4,282,563 | 8/1981 | Ohta et al. | 362/216 |

Primary Examiner—Harold A. Dixon
Attorney, Agent, or Firm—Frishauf, Holtz, Goodman and Woodward

[57] ABSTRACT

A circular fluorescent lamp unit comprises a circular tubular fluorescent lamp; a housing secured inside the space formed by the circular fluorescent lamp, the housing containing the ballast and starting device; and a base for connection to a supply voltage, the base being connected to the housing concentrically with the circular fluorescent lamp. The improvement resides in that the housing is an elongate hollow body which extends diametrically across the space defined by the circular fluorescent lamp; the housing having one end for enclosing the ends of the circular fluorescent lamp and another end for taking support against the wall of the circular fluorescent lamp which is diametrically opposite to the ends of the circular fluorescent lamp. In a preferred embodiment, the housing comprises two interconnected form locking housing cup-shaped members.

8 Claims, 6 Drawing Figures

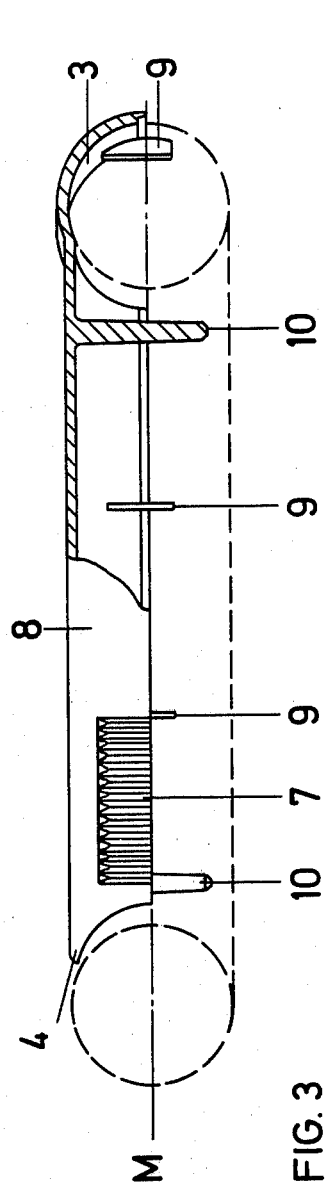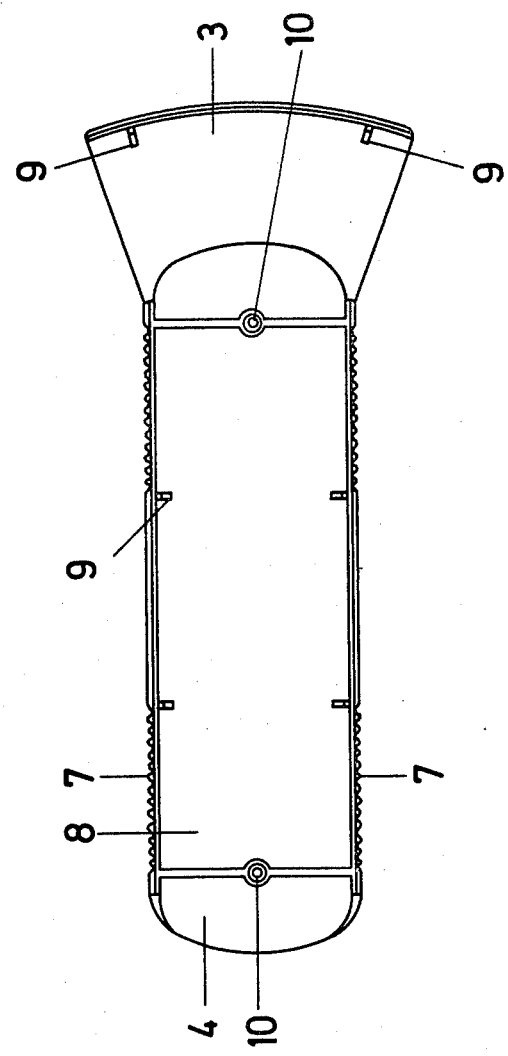
FIG. 3
FIG. 4

CIRCULAR FLUORESCENT LAMP WITH IMPROVED HOUSING CONTAINING BALLAST AND STARTING DEVICE

BACKGROUND OF THE INVENTION

This invention relates to a circular fluorescent lamp with an integrated ballast and starting device and a base for connection to a supply voltage, the ballast and starting device being arranged in a housing which is secured inside the space formed by the circular fluorescent lamp, and the base being connected to the housing concentrically with the circular fluorescent lamp.

Various fluorescent lamps of this type are known. Constructions in which the housing surrounds the fluorescent lamp itself, known from West German DE-OS No. 28 19 550, have a character of a luminaire. The resulting enlarged lamp unit is in most cases unsuited for use in existing fittings.

The circular fluorescent lamp described in U.S. Pat. No. 2,697,777, the entire contents of which are incorporated herein by reference, has a coaxial ellipsoidal housing for the ballast and starting device to which a screw base is affixed, the housing being arranged inside the space formed by the fluorescent lamp. The fluorescent lamp rests on wire brackets which are attached to the housing. This construction may be operated only base down.

U.S. Pat. No. 4,109,303, the entire contents of which are incorporated herein by reference, describes a lamp unit comprising one or several concentrically arranged circular fluorescent lamps. Each of the fluorescent lamps is supported by a square base plate of transparent plastic material whose four corners are bent around the fluorescent lamp in clip-like manner. The ballast is affixed to the base plate inside the space formed by the innermost lamp. The screw base is arranged on the flat backside of the base plate. The lamp unit does not have a closed housing; the lamp wiring is free and visible.

The main object of the present invention is to provide a compact lamp unit which is easy to handle and which may be inserted in existing fittings.

SUMMARY OF THE INVENTION

In a circular fluorescent lamp unit comprising a circular tubular fluorescent lamp having two ends which are substantially adjacent each other; a housing secured inside the space formed by the circular fluorescent lamp, the housing containing an integrated ballast and starting device; and a base for connection to a supply voltage, the base being connected to the housing concentrically with the circular fluorescent lamp; the improvement in accordance with the invention resides in that the housing is an elongate hollow body which extends diametrically across the circular fluorescent lamp; and that the housing has one end which includes means for enclosing the ends of the circular fluorescent lamp and another end which includes means for taking support against the wall of the circular fluorescent lamp which is diametrically opposite to the ends of the circular fluorescent lamp.

A particularly good hold of the second mentioned housing end is obtained when it encompasses the fluorescent lamp at least partly.

In a preferred embodiment, the housing comprises two housing cups which are interconnected in form-locking manner. The height of the housing is preferably about equal to the tube diameter of the circular fluorescent lamp. The cross-section of the housing may, for example, have any of the following shapes: square, rectangle, circle, ellipse, oval, etc.

BRIEF DESCRIPTION OF THE DRAWINGS

FIG. 3 shows the upper housing cup-shaped member partly broken open in side view;

FIG. 4 shows the upper housing cup-shaped member from the inside;

DETAILED DESCRIPTION

Figure 1:
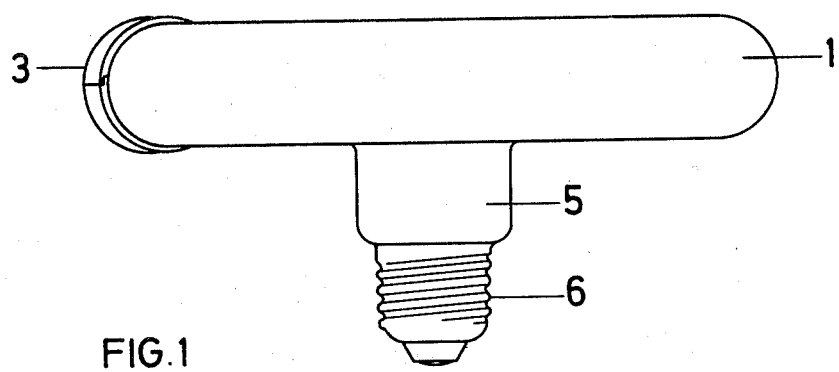
FIG. 1 is a side view of a circular fluorescent lamp unit in accordance with the invention.
Figure 2:
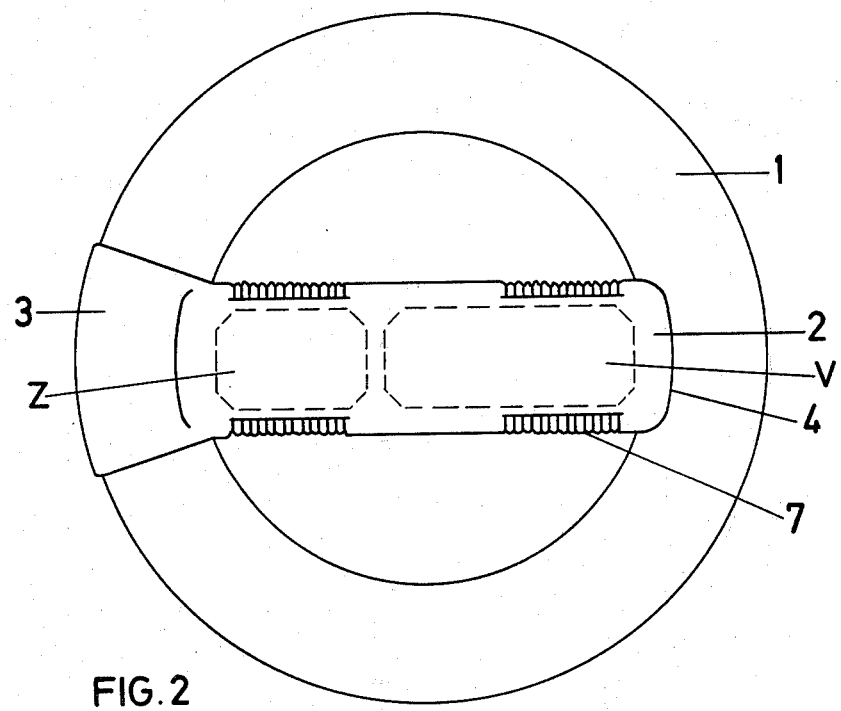
FIG. 2 is a top view of the circular fluorescent lamp unit of FIG. 1.
Figure 5:
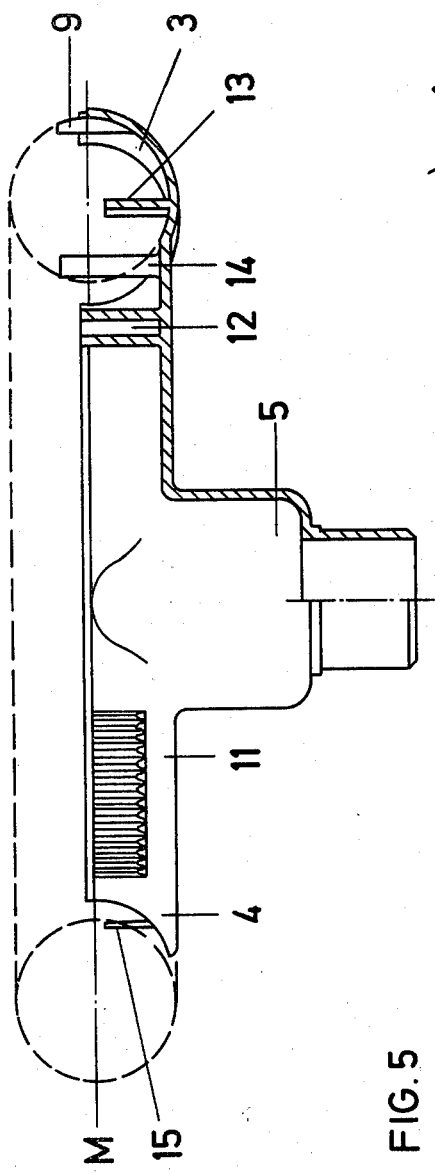
FIG. 5 shows the lower housing cup-shaped member, half of it in cross-section.
Figure 6:
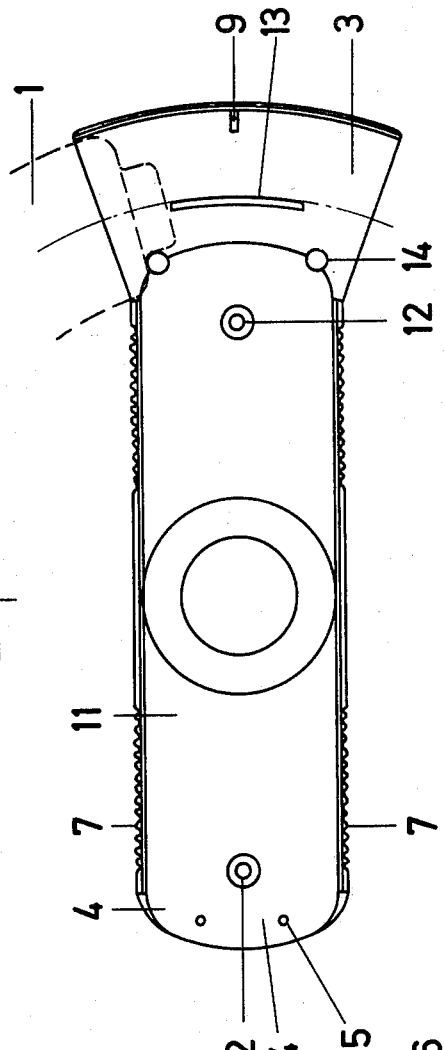
FIG. 6 shows the lower housing cup-shaped member from the inside.

The compact circular fluorescent lamp illustrated in FIGS. 1 and 2 comprises essentially a circular lamp 1 and a housing 2 arranged to extend diametrically of the circular lamp 1. One end of the housing 2 has a fan-like enlargement 3 which encompasses the ends of the lamp 1. The second housing end 4 takes support against the wall opposite the ends of the lamp 1 and partly encompasses it. Concentrically with the lamp 1, a cylindrical shoulder 5 is integrally formed on the underside of the housing 2. A screw base 6, as is conventionally used for incandescent lamps, is affixed to the end of the cylindrical shoulder 5. At least a part of the lateral surface of the housing 2 is provided with transverse grooves 7 (or similar recesses) which facilitate handling of the unit of lamp 1 and housing 2. Inside the housing 2 is arranged the ballast v and starting device 2 which are required for operating the circular fluorescent lamp and which are well known and preferably comprise electronic components. The housing 2 comprises an upper housing cup-shaped member (FIGS. 3 and 4) and a lower housing cup-shaped member (FIGS. 5 and 6). The longitudinal axis M (FIGS. 3 and 5) of the housing 2 containing the ballast and starting device preferably lies on the plane of the transverse axis of the circular fluorescent lamp 1.

FIGS. 3 and 4 show different views of the upper housing cup 8. The lamp 1 is shown in dotted line in FIG. 3. Inside the upper housing cup 8, lugs 9 are integrally formed on the border region at a certain spacing to obtain a formlocking engagement of the upper housing cup 8 with the lower housing cup (FIGS. 5 and 6). Conical pins 10 are integrally formed on the longitudinal axis of the upper housing cup 8 close to the respective ends 3 and 4. The pins 10 protrude into the interior of the housing and extend across the middle line M (which corresponds to the longitudinal axis of the housing 2). The pins 10 serve to fasten the upper housing cup 8 to the lower housing cup (FIGS. 5 and 6). The upper housing cup 8 is provided on a part of the lateral surface thereof with transverse grooves 7.

FIGS. 5 and 6 show different views of the lower housing cup 11. FIG. 5 shows the lamp 1 in dotted lines. FIG. 6 shows one end of the lamp 1 in dotted lines. Inside the fan-like enlargement 3 a further lug 9 for formlocking engagement of the two housing cups 8 and 11 is integrally formed on the border region on the longitudinal axis. Bushing or receptacles 12 designed so as to receive the conical pins 10 of the upper housing cup 8 are integrally formed on the lower housing cup 11 on the longitudinal axis. Bushings or receptacles 12 protrude into the interior of the housing and extend approximately to the middle line M. Connection of the two housing cups 8 and 11 is effected by pressing the conical pins 10 into the bushings or receptacles 12, thus bringing about a secure, undetachable press fit. The lugs 9 insure that the respective border regions of the housing cups 8 and 11 are in registration and meet in clean formlocking manner. The end 3 of the housing 2 encompassing the ends of the circular fluorescent lamp is provided with elements such as webs and/or pins which abut corresponding parts of the fluorescent lamp and fix the position thereof. Inside the fan-like enlargement 3 of the lower housing cup 11 is provided a spacer web 13 at the circular middle line of the lamp 1 which is arranged between the ends of the lamp 1. At the end section of the fan-like enlargement 3 are provided two rigid pins 14 which protrude into the interior of the housing 2 and extend slightly across the middle line M. The rigid pins 14 support the lamp 1 at the rolled-in ends of the lamp and fix lamp 1 in position. The spacer web 13 and the pins 14 may be provided in combination for the best result, as shown, or may alternately and separately be provided.

In order to compensate for possible manufacturing tolerances of the circular fluorescent lamp which might have a disadvantageous effect on the stability of the connection between the fluorescent lamp 1 and the housing 2, elastic support elements, such as for example pins or webs integrally formed on the housing cups or a lining are advantageously provided at the housing ends. More specifically, at the other end 4 of the lower housing cup 11 are provided support elements in the form of elastic pins 15 which compensate for such possible tolerances of the lamp 1 and constitute an additional means for fixing the lamp in position.

A cylindrical shoulder 5 is integrally formed on the lower housing cup 11 concentrically with the lamp 1 and directed in the longitudinal axis of the lamp, and a screw base 6 (FIG. 1) is attached to the end thereof. The shoulder 5 is made as short as possible. Due to this construction, the forces acting on the lamp base 6 and thus on the socket of the fitting to which the lamp is attached are minimized.

A part of the lateral surface of the lower housing cup 11—as well as of the upper housing cup 8—is provided with the above described transverse grooves or recesses 7 which facilitate handling of the unit.

For security reasons, the two housing cups 8 and 11, once connected, may not be detached from one another. Such a secure connection may be brought about in various ways. Suitable connections are, for example, snaps, ultrasonic welding, glue, rivets, and, in particular, press connections as described above. An undetachable press fit is obtained by the conical pins 10 which are integrally formed on one of the housing cups (upper housing cup 8) and engage in corresponding cylindrical bushings 12 integrally formed on the other housing cup (lower housing cup 11).

The circular fluorescent lamp in accordance with the invention is compact and the diametrically arranged housing 2 permits handling thereof with only one hand. The housing 2 has the dual function of supporting the circular fluorescent lamp 1 and containing the ballast and starting device, and is connected in a simple manner to the fluorescent lamp 1. The ballast and starting device "does not exist" so as to speak for someone who looks at the lamp. Since no parts of the housing or of the lamp support protrude beyond the fluorescent lamp, the lamp unit may readily be inserted into existing fittings. The integrated ballast and starting device and the base permit insertion of the circular fluorescent lamp also in a fitting originally provided for incandescent lamps. The base 6 arranged close to the plane of the circular fluorescent lamp 1 gives the lamp unit a great degree of stability.

We claim:

1. A circular fluorescent lamp structure comprising:
a circular fluorescent lamp (1) having two opposite ends;
a housing (2, 5) located substantially completely inside the inner spaced formed by the circular fluorescent lamp (1);
an integrated ballast (V) and starting device (Z) and a base (6) for direct connection to a supply voltage, said ballast and starting device being completely contained within said housing (2, 5);
said base (6) being affixed to said housing (2, 5) concentrically with said circular fluorescent lamp (1);
said housing comprising first and second housing parts (2, 5), said first housing part (2) being an elongate hollow body which extends only diametrically across said inner space formed by said circular fluorescent lamp (1) with the remainder of said inner space being open, said first housing part (2) comprising two interconnected formlocking housing cup-shaped members (8, 11) fixedly connected together, and said second housing part (5) being integrally formed with said first housing part (2) on one of said cup-shaped members and said second housing part (5) extending substantially perpendicularly to said first housing part (2) concentrically with said circular fluorescent lamp (1), one end (3) of at least one of said cup-shaped members (8, 11) of said first housing part (2) completely enclosing and mounting said opposite ends of said circular fluorescent lamp (1), and the other end (4) of at least one of said cup-shaped members (8, 11) of said first housing part enclosing and bearing against at least a portion of the wall of said circular fluorescent lamp (1) facing said inner space at a location opposite said ends of said circular fluorescent lamp;
said base (6) being secured non-detachably to an end of said second housing part(s); and
the height of said first housing part (2) within said inner space formed by said circular fluorescent lamp (1) being no greater than the tube diameter of said circular fluorescent lamp so that said first housing part is within the confines of said lamp in said inner space.

2. The circular fluorescent lamp of claim 1, wherein said first housing part has a longitudinal axis, and wherein said cup-shaped members join each other at a separating line, said separating line of said longitudinal axis lying on the plane of the transverse axis of said circular fluorescent lamp.

3. The circular fluorescent lamp of claim 1 wherein said opposite ends of said circular fluorescent lamp (1) comprise non-socketed seals.

4. The circular fluorescent lamp of claim 1 wherein said one end (3) of said first housing part (2) which encloses said non-socketed seals of said circular fluorescent lamp (1) comprises fixing elements (13, 14) for engaging and fixing the position of said circular fluorescent lamp relative to said housing (2).

5. The circular fluorescent lamp of claim 4, wherein at least one of said fixing elements (13, 14) engages said non-socketed ends of said circular fluorescent lamp (1).

6. The circular fluorescent lamp of claim 1 wherein said other end (4) of said first housing part (2) takes support against said circular fluorescent lamp (1) and comprises elastic support elements (15) for abutting against said circular fluorescent lamp.

7. A circular fluorescent lamp structure comprising:
a circular fluorescent lamp (1) having two opposite ends;
a housing (2, 5) located substantially completely inside the inner space formed by the circular fluorescent lamp (1);
an integrated ballast (V) and starting device (Z) and a base (6) for direct connection to a supply voltage, said ballast and starting device being completely contained within said housing (2, 5);
said base (6) being affixed to said housing (2, 5) concentrically with said circular fluorescent lamp (1);
said housing comprising first and second housing parts (2, 5), said first housing part (2) being an elongate hollow body which extends only diametrically across said inner space formed by said circular fluorescent lamp (1) with the remainder of said inner space being open, said first housing part (2) comprising two interconnected formlocking housing cup-shaped members (8, 11) fixedly connected together, and said second housing part (5) being integrally formed with said first housing part (2) on one of said cup-shaped members and said second housing part (5) extending substantially perpendicularly to said first housing part (2) concentrically with said circular fluorescent lamp (1), one end (3) of at least one of said cup-shaped members (8, 11) of said first housing part (2) completely enclosing and mounting said opposite ends of said circular fluorescent lamp (1), and the other end (4) of at least one of said cup-shaped members (8, 11) of said first housing part enclosing and bearing against at least a portion of the wall of said circular fluorescent lamp (1) facing said inner space at a location opposite said ends of said circular fluorescent lamp;
said base (6) being secured non-detachably to an end of said second housing part(s);
said opposite ends of said circular fluorescent lamp (1) comprising non-socketed seals; and
said one end of at least one of said cup-shaped members (8, 11) of said first housing part (2) which encloses said non-socketed seals of said ends of said circular fluorescent lamp comprising fixing elements (13, 14) for engaging and fixing the position of said circular fluorescent lamp relative to said housing (2).

8. A circular fluorescent lamp structure comprising:
a circular fluorescent lamp (1) having two opposite ends;
a housing (2, 5) located substantially completely inside the inner space formed by the circular fluorescent lamp (1);
an integrated ballast (V) and starting device (Z) and a base (6) for direct connection to a supply voltage, said ballast and starting device being completely contained within said housing (2, 5);
said base (6) being affixed to said housing (2, 5) concentrically with said circular fluorescent lamp (1);
said housing comprising first and second housing parts (2, 5), said first housing part (2) being an elongate hollow body which extends only diametrically across said inner space formed by said circular fluorescent lamp (1) with the remainder of said inner space being open, said first housing part (2) comprising two interconnected formlocking housing cup-shaped members (8, 11) fixedly connected together, and said second housing part (5) being integrally formed with said first housing part (2) on one of said cup-shaped members and said second housing part (5) extending substantially perpendicularly to said first housing part (2) concentrically with said circular fluorescent lamp (1), one end (3) of at least one of said cup-shaped members (8, 11) of said first housing part (2) completely enclosing and mounting said opposite ends of said circular fluorescent lamp (1), and the other end (4) of at least one of said cup-shaped members (8, 11) of said first housing part enclosing and bearing against at least a portion of the wall of said circular fluorescent lamp (1) facing said inner space at a location opposite said ends of said circular fluorescent lamp;
said base (6) being secured non-detachably to an end of said second housing part(s); and
said other end of at least one of said cup-shaped members (8, 11) of said first housing part (2) comprising elastic support elements (15) for abutting against said circular fluorescent lamp.

* * * * *